Figure 1:
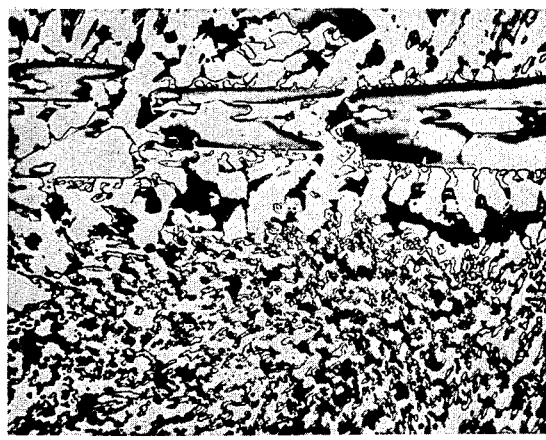

United States Patent Office 3,244,506
Patented Apr. 5, 1966

3,244,506
CUTTING TOOL MATERIAL
Orville W. Reen, Natrona Heights, Pa., assignor to Allegheny Ludlum Steel Corporation, Brackenridge, Pa., a corporation of Pennsylvania
Filed Sept. 8, 1964, Ser. No. 395,082
The portion of the term of the patent subsequent to Sept. 29, 1981, has been disclaimed
10 Claims. (Cl. 75—.5)

This invention relates to cutting tool material and more particularly to powder suitable for forming solid cutting tool stock and a method of forming cutting tool stock from the powder.

This application is a continuation-in-part of application Serial No. 190,475, now U.S. Patent No. 3,150,444, entitled "Method of Producing Alloy Steel."

One of the best metallurgical microstructures for providing excellent cutting tools is a strong metal matrix in which are dispersed hard fine compounds of carbon, boron, and nitrogen and principally of carbon. The matrix may be a single element such as iron, or it may be a solid solution of metals such as, for example, a solid solution of cobalt and chromium. Normally, titanium, tungsten, molybdenum, tantalum, columbium, zirconium, hafnium, vanadium, and chromium are the most common elements added to react with the carbon, nitrogen, and boron to provide the hard carbides, nitrides, and borides which are dispersed in the matrix. Since carbon is the principal element added for the reaction with these elements, the term "carbides" will be used throughout the specification, it being understood that greater or lesser amounts of nitrides or borides will in fact be present, and these nitrides and borides are intended to be covered when present by the term "carbides." Also, the elements listed above which react with carbon, nitrogen and boron are commonly known as carbide-forming elements, and as well as forming carbides they also form nitrides and borides and so to this extent where the term carbide-forming elements is used, the term embraces nitride and boride forming elements.

Not only do the carbides add to the abrasion resistance of the material, they also add to the strength of the material, and when they are present in sufficient quantity, the resulting material cannot be economically hot worked. For example, material known as ALX, a trade name of Allegheny Ludlum Steel Corporation, which is comprised of about 2% carbon, 35% chromium, 17% tungsten, 1% cobalt, 1% boron, 1% molybdenum, and 1% manganese plus silicon, has too high a strength to be hot worked; therefore, according to prior art methods, cutting tools formed from this material have to be directly cast-to-shape with only the final grinding remaining. This not only severely limits the applications to which the material may be applied, but it also results in rather costly cutting tools since there is a very low yield of material due to the necessary gates, risers and shank heads required. Also, the as-cast cutting tools will have a characteristic cast structure with rather large grains and coarse carbides. These large grains and coarse carbides are not as beneficial for strength and abrasion resistance required in cutting tools as are finer grains and smaller dispersed carbides. Also, the as-cast structure cannot be changed significantly by heat treating.

Accordingly, it is a principal object of this invention to provide an improved cutting tool material.

A more particular object of this invention is the provision of metal powder suitable for forming into cutting tool stock.

A still more particular object of this invention is the provision of a metal powder for forming into cutting tool stock which stock will be characterized by a fine dispersion of carbides in a strong fine-grained metal matrix.

An additional object of this invention is the provision of cobalt base pre-alloyed atomized metal powder which can be formed into cutting tool stock which stock is characterized by a dispersion of fine carbides within a cobalt matrix, or a matrix of a solid solution of cobalt and chromium.

Another, more general object of this invention is to provide a method of forming an improved cutting tool stock.

An additional object of this invention is the provision of a method of forming an improved cutting tool stock from a pre-alloyed atomized metal powder.

A further object of this invention is the provision of a method of making an improved cobalt base cutting tool stock which has a dispersion of fine carbides in a cobalt matrix, or matrix of cobalt and chromium in solid solution from a pre-alloyed atomized powder of the desired composition.

Figure 2:
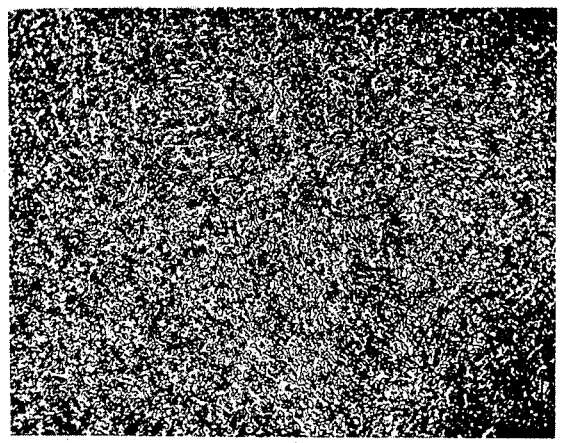

These and other objects, together with a fuller understanding of the invention, will become apparent from the following description when taken in conjunction with the accompanying drawing in which:

FIGURE 1 is a photomicrograph at 1000× of the microstructure of a tool bit cast from ALX material in the as-cast condition, and FIG. 2 is a photomicrograph at 1000× of the microstructure of cutting tool stock made according to the method of this invention from the pre-alloyed atomized powder of this invention.

In general, this invention is directed toward the production of a pre-alloyed atomized metal powder and a method of forming from such powder cutting tool stock having the desired characteristics of finely dispersed carbides in a fine-grain metal matrix.

This invention finds particular application in cobalt, nickel and iron base alloys which have from 0.60% to 5% carbon and at least 30% of carbide-forming elements selected from the group consisting of chromium, tungsten, molybdenum, titanium, tantalum, columbium, zirconium, hafnium, and vanadium. These materials are too strong to be worked from a solid as-cast condition. Also, solid materials of this composition have large as-cast grain size and rather large carbides, and this microstructure cannot be changed significantly by heat treatment. According to this invention, a material of this general type is melted with the composition controlled so that the melt contains the desired final composition of the material. The melted material is then atomized to form a powder with an average diameter of the particles less than 0.25 inch. Preferably, the particles of the powder are of sufficient fineness to pass through a 20-mesh screen; and, for optimum results, the powder particles should be sufficiently fine to pass through a 100-mesh screen. Any one of several methods of atomization of the powder may be used. An adequate description of one apparatus and process for suitable atomization is contained in U.S. Patent 2,956,304 issued to William L. Batten et al. This patent reveals not only a suitable apparatus, but a suitable method of controlling the size of the atomized particles. Although powder materials may be manufactured by other means for the purpose of this invention, atomization of a prealloyed powder is an essential step in the process of producing the powder particles since it is the quench properties of the atomized particles that are primarily responsible for the resultant fine, evenly dispersed carbide particles in the resulting microstructure. The resultant powder formed from the atomization process is hot worked by any conventional hot working method, such as, extrusion, rolling, hot pressing or other mechanical compacting process to densify the particles and produce a solid material of the desired size, shape and configuration, and a density substantially equal to that of the alloy in its cast state.

Several different compositions of material were melted and atomized to form a powder according to this invention. The compositions of these materials are given in Table I. Although only chromium, molybdenum, tungsten and cobalt were used as carbide formers because of their important commercial significance, it will be recognized by those skilled in the art that tantalum, zirconium, hafnium and vanadium could also be used.

TABLE I

| Atomizing Run No. | C | Cb | Ti | Cr | Mo | W | Co | Mn | Si | Fe | Percent Carbide Formers [1] |
|---|---|---|---|---|---|---|---|---|---|---|---|
| 39 | 1.26 | 10.15 | | 15.09 | | | 73.02 | 0.095 | 0.085 | | 25.24 |
| 40 | 1.14 | 10.08 | | 15.00 | 10.09 | | 62.34 | 0.36 | 0.47 | 0.35 | 35.17 |
| 41 | 1.16 | 10.11 | | 15.23 | 10.05 | 10.28 | 50.74 | 0.42 | 0.38 | 1.24 | 35.29 |
| 42 | 1.17 | 9.95 | | 15.41 | | 10.14 | 61.02 | 0.75 | 0.44 | 0.35 | 35.50 |
| 44 | 0.47 | 3.98 | | 14.73 | | | 80.00 | 0.068 | 0.28 | 0.47 | 18.71 |
| 45 | 0.60 | 3.71 | | 15.22 | 10.51 | | 68.94 | 0.46 | 0.46 | | 29.44 |
| 46 | 0.62 | 3.78 | | 15.03 | 9.95 | 10.64 | 59.00 | 0.45 | 0.36 | | 39.40 |
| 47 | 0.55 | 4.03 | | 15.18 | | 9.96 | 69.98 | 0.024 | 0.17 | | 29.17 |
| 51 | 0.77 | | 2.80 | 15.18 | | | 79.74 | 0.42 | 0.40 | | 17.98 |
| 54 | 0.81 | | 2.73 | 15.28 | 9.99 | | 70.43 | 0.40 | 0.40 | | 28.00 |
| 55 | 0.81 | | 2.60 | 15.12 | | 9.92 | 70.34 | 0.60 | 0.34 | | 27.64 |
| 56 | 0.80 | | 2.40 | 15.09 | 10.14 | 10.04 | 60.21 | 0.56 | 0.30 | | 37.67 |

[1] Total percent of Cb, Ti, Cr, Mo, W.

The powders formed from the atomizing process were screened to provide fractions of −20+30 mesh and −100 mesh. The powders that were formed were deoxidized in hydrogen to remove the oxide surface of the particle. Selected fractions of the powders were then consolidated into solid dense bars by extrusion. This consolidation was accomplished by packing the powder into containers, the containers being formed from mild steel tubing having 3⅛″ outside diameter and ¼″ wall thickness. End plugs were welded in both ends of each of the containers and an air passage was left to the interior of the tubing wherein the powder was packed. After the powders were packed therein, the interior of the tubing was evacuated to a pressure of less than 25 microns of mercury, and the air passage was then sealed. This was to prevent oxidation of the metal powder during subsequent heating. Each of the sealed containers with the powder therein was heated to a temperature of 1500° F. and held for 15 minutes and then transferred to a furnace, the temperature of which was maintained at 2150° F. When the containers had reached the temperature of 2150° F. they were held for 15 minutes at temperature. Each of the containers with the powders therein was then extruded through a conventional extrusion die to a bar 1″ in diameter; conventional extrusion lubricants were utilized. The extrusions were performed on a 500-ton vertical extrusion press at pressures ranging from 2100 pounds per square inch to 2700 pounds per square inch. The metal powders within the carbon steel tubing were compacted by this extrusion to a density substantially equivalent to the alloy in its cast state. The carbon steel sheath on each of the extruded bars was removed either by pickling in acid, machining, or by a combination of pickling and machining. The densities and Rockwell C hardnesses of the final extruded product were measured, and these are shown in Table II together with the pressure used for each extrusion.

TABLE II

| Extrusion No. | Atomizing Run No. | Mesh Size of Powder | Extrusion Pressure (p.s.i.) | Density, g./cu. cm. | Rockwell C Hardness (Two Readings) |
|---|---|---|---|---|---|
| 76 | 39 | −20+30 | 2,700 | 8.45 | 51.7 and 52.4 |
| 77 | 40 | −20+30 | 2,350 | 8.88 | 56.5 and 57.0 |
| 78 | 42 | −20+30 | 2,300 | 8.94 | 58.1 and 58.6 |
| 79 | 41 | −20+30 | 2,200 | 9.02 | 61.0 and 62.2 |
| 87 | 44 | −20+30 | 2,250 | 8.55 | 46.3 and 47.1 |
| 88 | 45 | −20+30 | 2,250 | 8.69 | 54.1 and 54.5 |
| 90 | 47 | −20+30 | 2,300 | 9.02 | 48.8 and 50.0 |
| 100 | 47 | −100 | 2,400 | 9.04 | 53.4 and 53.5 |
| 89 | 46 | −20+30 | 2,300 | 9.18 | 62.0 and 63.0 |
| 123 | 51 | −20+30 | 2,350 | 8.37 | 48.2 and 49.0 |
| 124 | 54 | −20+30 | 2,200 | 8.52 | 55.2 and 55.8 |
| 125 | 55 | −20+30 | 2,350 | 8.86 | 52.0 and 52.8 |
| 126 | 56 | −20+30 | 2,200 | 9.04 | 60.3 and 61.0 |
| 127 | 56 | −100 | 2,100 | 9.03 | 61.1 and 61.4 |

As can be seen from an examination of Table II, extrusion Nos. 76, 77, 78, 87, 88, 90, 100, 123, 124 and 125, where the total amount of carbide-forming elements is less than 30%, had Rockwell C hardnesses of less than 60; whereas extrusions 79, 89, 126 and 127, wherein the total amount of the carbide-forming elements is more than 30%, had Rockwell C hardnesses of greater than 60. Since virtually all cutting tool applications require that the tool have a hardness of at least 60 Rockwell C, it is necessary that there be at least 30% of the carbide-forming elements in the alloy. It is also necessary to have at least .60% carbon present in order to react with the carbide-forming elements present in order to provide the carbides required for strengthening. Five percent carbon is the maximum required for reacting with the carbide-forming elements, and any excess over 5% will tend to weaken the structure. It should be noted that the different carbide-forming elements do have different degrees of solubility in the matrix material, and hence a certain amount of the carbide-forming elements will go into solid solution with the base material which will result in the strengthening of the base material. This is particularly true of chromium, and in fact, where there is a substantial amount of chromium present in the alloy a marked amount of strengthening of the cobalt base matrix will occur by the chromium going into solid solution with the cobalt. Chromium also imparts oxidation resistance to the alloy. Because of these properties, larger amounts of chromium can be present, the only requirement being that there be more cobalt than chromium and that the total amount of cobalt and chromium be at least 50% of the composition of the alloy in order to provide a suitable matrix material.

It can also be seen from a comparison of extrusion Nos. 126 and 127 which were made from the same alloy but different size powders, that the −100 mesh powder resulted in a somewhat harder product than the −20+30 mesh powder. For this reason the −100 mesh powder is preferred.

A representative photomicrograph taken from extrusion 89 is shown in FIG. 2. This photomicrograph shows a microstructure of very fine, evenly dispersed carbides in a very fine-grain matrix. This microstructure can be compared to that shown in FIG. 1 of a tool bit cast from ALX material having a composition of 2% carbon, 35% chromium, 17% tungsten, 43% cobalt, 1% boron, 1% molybdenum and 1% manganese plus silicon. It can be seen that this cast structure has very large grains and very large agglomerated carbides. These large carbides and large grains are the result of the slow cooling inherent in an as-cast solid material of this composition.

Cutting tools were formed from the four extruded bars which exhibited a Rockwell C hardness of 60 or greater. Each cutting tool was prepared by grinding equal amounts from the side of each bar to make ½" square tools, 2½" long. The tools were ground in a fixture to 30° angles and 10° clearances with $\frac{1}{32}$" nose radii. For comparative purposes, two commercial tool steel bars and a commercial cast-to-shape tool of ALX material were ground to the same geometry. The two commercial tool steel grades were AISI Type T-15 and AISI Type M-2. Each of the tools so prepared was used to cut a 4" diameter by 34" long test bar of AISI type 316 stainless steel on a machinability lathe at 120 surface feet per minute, 0.050" depth of cut, 0.006" feed, using a solution of water-soluble oil and water as a coolant. A wear land of about 0.016" on the tool was used as the end point of the test. If this amount of wear was not achieved within twenty-five minutes, the test was discontinued and the amount of wear measured. The results of these tests are shown in Table III.

TABLE III

| Extrusion | Max. Wear, Inches | Cutting Time, Minutes |
|---|---|---|
| 79 | 0.010 | 25 |
| 89 (Test one) | 0.012 | 25 |
| 89 (Test two) | 0.008 | 25 |
| 126 | 0.012 | 25 |
| 127 | 0.012 | 25 |
| AISI Type T-15 | 0.016 | 22 |
| ALX | 0.012 | 25 |
| AISI Type M-2 | 0.016 | [1] 7.7 |

[1] Five Test Average.

As can be seen from an examination of Table III, the tools formed from cutting tool material made according to this invention performed significantly better than either of the conventional tool steel alloys and as well or better than the ALX cast tool steel of similar composition.

Tests performed on iron base alloys and nickel base alloys with carbide formers being added, resulted in a material having good hardness and strength characteristics suitable for cutting tool applications.

Although several embodiments of this invention have been shown and described, various adaptations and modifications may be made without departing from the scope and appended claims.

I claim:

1. A method of producing a solid alloy suitable for forming into a cutting tool, said method comprising, providing atomized pre-alloyed powder of said alloy having a particle size of not more than .25" diameter with a composition consisting essentially of, from about 0.60% to about 5% carbon, at least 30% carbide-forming elements selected from the group consisting of Cr, W, Mo, Ti, Ta, Cb, Zr, Hf and V and the remainder M and incidental impurities, wherein M is selected from the group consisting of cobalt, iron and nickel, and wherein the amount of M exceeds the amount of chromium, and the amount of M exceeds the total amount of carbide formers other than chromium, and the total amount of M plus chromium is at least 50%, compressing and mechanically hot working said powder to effect a solid material of a density substantially equivalent to the alloy in its cast state.

2. The method of claim 1 wherein the powder particle size is sufficiently fine that the particles will pass through a 20-mesh screen size.

3. The method of claim 1 wherein the powder particle size is sufficiently fine that the particles will pass through a 100-mesh screen size.

4. The method of claim 1 wherein said compressing and hot working includes extruding to form a solid bar.

5. The method of claim 4 wherein the extrusion is performed with the powder contained within a container.

6. A method of producing a solid cobalt base alloy suitable for forming into a cutting tool, said method comprising, providing atomized pre-alloyed powder of said alloy having a particle size of not more than .25" diameter with a composition consisting essentially of from about 0.60% to about 5% carbon, at least 30% carbide-forming elements selected from the group consisting of Cr, W, Mo, Ti, Ta, Cb, Zr, Hf and V, the remainder cobalt and incidental impurities, and wherein the amount of cobalt exceeds the amount of chromium, and the amount of cobalt exceeds the total amount of carbide formers other than chromium, and the total amount of cobalt plus chromium is at least 50%, compressing and mechanically hot working said powder to effect a solid material of a density substantially equivalent to the alloy in its cast state.

7. The method of claim 6 wherein the powder particle size is sufficiently fine that the particles will pass through a 20-mesh screen size.

8. The method of claim 6 wherein the powder particle size is sufficiently fine that the particles will pass through a 100-mesh screen size.

9. The method of claim 6 wherein said compressing and hot working includes extruding to form a solid bar.

10. The method of claim 9 wherein the extrusion is performed with the powder contained within a container.

References Cited by the Examiner

UNITED STATES PATENTS

| 1,910,884 | 5/1933 | Comstock | 75—137 |
| 2,257,878 | 10/1941 | Brennan | 264—5 |
| 2,370,608 | 2/1945 | Udy | 264—12 |
| 2,384,892 | 9/1945 | Comstock | 264—11 |
| 2,823,988 | 2/1958 | Grant et al. | 29—420.5 |
| 2,855,295 | 10/1958 | Hansel | 75—171 |
| 2,961,312 | 11/1960 | Elbaum | 75—171 |
| 3,150,444 | 9/1964 | Reen | 29—420.5 |

OTHER REFERENCES

Metals Handbook, 1948 edition, pp. 62 and 63.

DAVID L. RECK, *Primary Examiner.*

N. F. MARKVA, *Assistant Examiner.*

---

Notice of Adverse Decision in Interference

In Interference No. 96,147 involving Patent No. 3,244,506, O. W. Reen, CUTTING TOOL MATERIAL, final judgment adverse to the patentee was rendered Aug. 25, 1969, as to claims 1, 2, 3, 6, 7 and 8.

[*Official Gazette March 17, 1970.*]

Notice of Adverse Decision in Interference

In Interference No. 96,147 involving Patent No. 3,244,506, O. W. Reen, CUTTING TOOL MATERIAL, final judgment adverse to the patentee was rendered Aug. 25, 1969, as to claims 1, 2, 3, 6, 7 and 8.

[*Official Gazette March 17, 1970.*]